(12) United States Patent
Futch

(10) Patent No.: US 8,557,126 B2
(45) Date of Patent: Oct. 15, 2013

(54) CHEMICAL ADMINISTRATOR FOR CONTROLLABLY TREATING WASTEWATER

(75) Inventor: Stephen J. Futch, Boise, ID (US)

(73) Assignees: Stephen J. Futch, Cascade, ID (US); Beatrice Futch, Cascade, ID (US)

( * ) Notice: Subject to any disclaimer, the term of this patent is extended or adjusted under 35 U.S.C. 154(b) by 570 days.

(21) Appl. No.: 12/763,913

(22) Filed: Apr. 20, 2010

(65) Prior Publication Data
US 2011/0253636 A1    Oct. 20, 2011

(51) Int. Cl.
   *C02F 9/04*    (2006.01)
(52) U.S. Cl.
   USPC ......... 210/749; 210/198.1; 210/232; 4/226.1; 137/101.11
(58) Field of Classification Search
   USPC ............. 4/226.1; 137/101.11, 271, 255; 141/100, 103, 105; 222/133, 132, 222/145.1, 145.4, 416; 422/283; 210/198.1, 210/232, 749
   See application file for complete search history.

(56) References Cited

U.S. PATENT DOCUMENTS

| | | | |
|---|---|---|---|
| 650,161 A | 5/1900 | Williams | |
| 811,749 A | 2/1906 | Somers | |
| 942,978 A | 12/1909 | Snell | |
| 969,729 A | 9/1910 | Smith | |
| 4,841,578 A | 6/1989 | Mercer | |
| 4,873,727 A | 10/1989 | Homan | |
| 4,901,923 A | 2/1990 | McRoskey et al. | |
| 4,937,892 A | 7/1990 | Syrenne | |
| 4,984,306 A | 1/1991 | Sumerix | |
| 5,372,310 A | 12/1994 | Ketcham | |
| 5,388,280 A | 2/1995 | Sim | |
| 5,507,945 A | 4/1996 | Hansen | |
| 5,730,178 A * | 3/1998 | Zhadanov et al. | ............ 137/268 |
| 6,000,067 A | 12/1999 | Cascia | |
| 6,221,321 B1 * | 4/2001 | Fleischer et al. | ............ 422/282 |
| 6,749,133 B1 | 6/2004 | Ketcham et al. | |
| 2007/0017011 A1 | 1/2007 | Futch | |

OTHER PUBLICATIONS

Office Action mailed Jun. 23, 2009 in U.S. Appl. No. 11/186,379.
Office Action mailed Sep. 5, 2008 in U.S. Appl. No. 11/186,379.

* cited by examiner

*Primary Examiner* — Duane Smith
*Assistant Examiner* — Paul J Durand
(74) *Attorney, Agent, or Firm* — Shook, Hardy & Bacon, LLP

(57) ABSTRACT

Disclosed is a chemical administrator which delivers a chemical solution into a water supply line for a water-consuming device, e.g., a toilet in a recreational vehicle, for the purpose of treating waste-water before it is disposed in a holding tank. The apparatus has a container which holds the chemical solution. It also has a chemical administering system which siphons the chemical from the container into the water supply line using a vacuum created by the water moving through it.

10 Claims, 5 Drawing Sheets

CHEMICAL ADMINISTRATOR FOR CONTROLLABLY TREATING WASTEWATER

CROSS-REFERENCE TO RELATED APPLICATIONS

This application is related to U.S. application Ser. No. 11/186,379 filed Jul. 21, 2005, entitled "Chemical Administrator for Treating Wastewater From A Water-Consuming Device In A Self-Contained Bathroom System."

STATEMENT REGARDING FEDERALLY SPONSORED RESEARCH OR DEVELOPMENT

Not applicable.

TECHNICAL FIELD

This invention relates to the field of introducing treating chemicals into water in a sewer-storage system. More particularly, the present invention provides a new and useful method for treating wastewater in a self-contained bathroom, e.g., in a recreational vehicle or on a marine craft.

BACKGROUND OF THE INVENTION

Many recreational vehicles and marine craft have self-contained bathrooms. The fixtures in these bathrooms (e.g., toilets) are served using a pressurized source of clean water which introduces the clean water into the toilet bowl via a hose.

Waste water is disposed into holding tanks. The holding tank is typically located immediately below the toilet so that when the toilet is flushed, the wastewater drops down through a vertical conduit into the tank. The wastewater is maintained in the storage tank until it is able to be disposed of appropriately at a dumping facility.

The addition of chemicals to the wastewater is necessary to prevent odors and to assist in the decomposition process. These chemicals can be added in many different ways. One is for the owner to manually dispose them into the bowl during every use. Obviously this subjects the user to the mechanics involved, e.g., scooping or pouring the cleaner. But it also subjects them to properly metering the use. This presents the likelihood of human error. If too much cleaner is used, it is wasted. If too little, then holding-tank odor and soiling problems (caused by the failure to decompose the solid waste) may result.

Other techniques have been used in which the cleaner is introduced automatically using some sort of system. One such system automatically squirts a regulated quantity into the toilet bowl with each flush. Unfortunately, with these systems the cleaner sometimes is not thoroughly mixed into the waste water. This creates pockets of untreated areas in the holding tanks, and other pockets of over-treated areas.

One conventional system uses a block of disinfecting cleaner in the introduction pipe before the cleaner is introduced into the toilet. But these blocks are difficult to replace, and it is difficult to identify when they have run out of cleaning power. Further, because these systems are dependent on the cleaner being dissolved into the flowing water, disposal concentrations fluctuate greatly from flush to flush dependant on the amount of time allowed between flushes. This is because there is no means to adequately meter the amount of cleaner administered with each flush.

Therefore, there is need in the art for a system which adequately, accurately, and easily administers cleaning chemicals in a self-contained bathroom system.

SUMMARY

The present invention satisfies these administration needs by providing a chemical dispensing apparatus which delivers a chemical solution into a water supply line for a water-consuming device, such as a toilet, for the purpose of treating waste-water. The apparatus has a container which holds the chemical solution. It also has a chemical administering system which vacuums the chemical from the container into the water supply line.

Another aspect of the invention is an apparatus that includes a metering system for controlling the amount of chemical administered into the water line. In one embodiment, this system is attached to a set of containers that each have a tube configured with a differently-sized diameter, each of the tubes providing a flow path for controlled introduction of the chemical into the water supply line. Each of the containers being individually installed onto the system, thereby providing varying rates of flow upon interchanging the containers.

The administrating system comprises a pipe which is adapted to be spliced into the water supply line. It also includes a vertical conduit which has upper and lower ends. The upper end is tapped into the supply line and the lower end has an inlet which receives chemical up into the vertical conduit for the purpose of administering it into the supply line.

The pipe is secured to the container by an upper housing which is adapted to be fastened to an upper surface of the container. Also on the upper surface of the container is a fill opening with a removable cap so that the container can be filled with chemical.

BRIEF DESCRIPTION OF THE SEVERAL VIEWS OF THE DRAWINGS

In the accompanying drawings which form a part of the specification and which are to be read in conjunction therewith, and in which like reference numerals are used to indicate like parts in the various views.

DETAILED DESCRIPTION OF THE INVENTION

The present invention provides a system and method for delivering a chemical substance in a fluid delivery line for the purpose of sanitizing and deodorizing waste water which is destined for storage in a holding tank most typically in some sort of self contained system like those that exist in recreational vehicles, commercial airliners, or marine vessels. Other kinds of portable waste management systems, however, could use the devices and/or techniques disclosed herein and still fall within the scope of the present invention. The processes and devices could also be employed for other applications in which a fluid is chemically treated. Further, the present invention may take the form of a device embodiment or a method embodiment for chemically treating a fluid.

The device is a dispenser which is adapted so that it can be spliced into the pressurized water supply line for the water consuming device, which may be a toilet, shower, or any other kind of device which consumes water and produces waste water which is treatable. The device has a container which includes a fill cap. As water flows through the supply line, a vacuum is created in a vertical passageway which is joined into the supply line. This vacuum is used to siphon chemical up out of the container into the supply line. By the time the chemical—including water reaches the toilet (or other water-consuming device) it will be evenly mixed and better able to treat the waste water than if it were directly dispensed separately.

Figure 1:
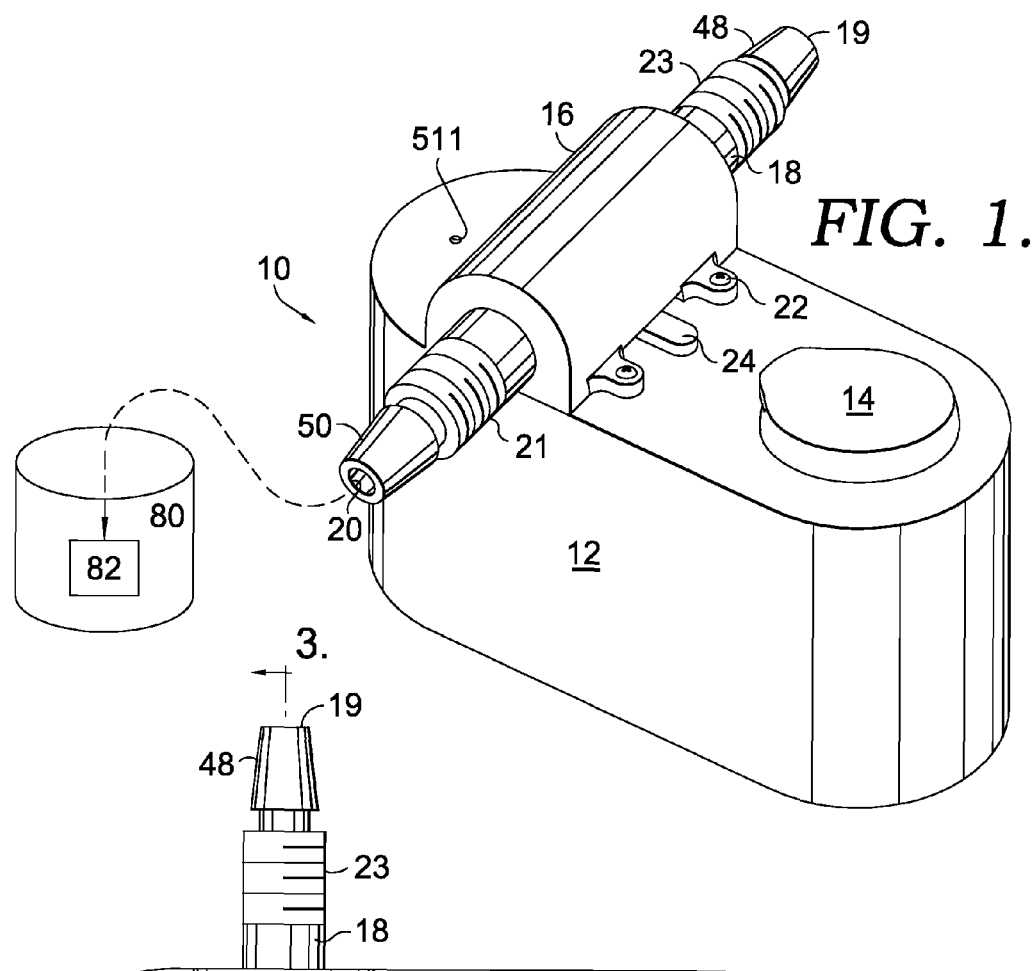
FIG. 1 is an exemplary perspective view of a chemical treatment dispenser having a set of orifices, according an embodiment of the present invention.

One embodiment of the present invention is shown in FIGS. 1-4. Referring first to FIG. 1, a perspective view of a device 10 depicts various components. The administrator 10 includes a chemical storage system. The most common chemical solutions used to treat waste water in recreational vehicles include formaldehydes, ammonias, or biological alternatives which are in liquid form. Here, the solution will be stored in a container 12. Container 12 is able to be filled with the chemical solution via a fill cap 14. In the preferred embodiment, container 12 is transparent or semitransparent to enable the user to know how full it is of chemical deodorizer. Fill cap 14 is located on an exposed area of an upper surface 15 of the container. When the user wishes to fill container 12 with chemical treatment solution, cap 14 is removed to reveal an opening (not shown) into the container. Fill cap 14 may be a snap-on type cap, but may also be a screw-on or any other type of cap if desired.

Container 12 is adapted to fluidly communicate with a water pipe 18. Physically, water pipe 18 is brought into junction with container 12 using an upper housing 16. In the preferred embodiment housing 16 is attached using a plurality of fasteners 22 which are received through flanges and bored into and thus couple upper housing 16 to surface 15 of the container.

In the embodiment disclosed in FIGS. 1-4, fasteners 22 are screws which are received into formed apertures (not shown) in upper surface 15. Other fastening mechanisms or arrangements, however, could be used as well and still fall within the scope of the present invention. For example, fastener 22 could alternatively use a snap-to-fit arrangement where prongs depend from the bottom of the upper housing and are received in receiving apertures in surface 15 on the container. Rivets, or other known types of fasteners could also be used which are capable of securing housing 16 to container 12.

Pipe 18 will receive water in a fluid inlet 19 and dispense treated water from a fluid outlet 20. A set of threads 23 are associated with inlet 19 and a second set of threads 21 are associated with outlet 20. Each end also has tapered portions 48 and 50 which enable tubing (not shown) to be easily slid onto and disposed onto the pipe ends. Thus, the device can be spliced into the pressurized water line which feeds into the fixture (or fixtures) such as the toilet by simply cutting the line and inserting device 10.

Once ends 19 and 20 are spliced into each of the cut ends of the water line tubing, the tubing is further secured using screw-on pipe nut (not shown) which have reciprocating threads that engage threads 21 and 23 and sealingly lock the tubing onto pipe 18. Alternatively, a quick-connect-coupler arrangement—which will also be known to those skilled in the art—could be used to accomplish this same task. It should be understood that the present invention should not be limited to any manner in which pipe 18 is fluidly connected into the water line.

Figure 2:
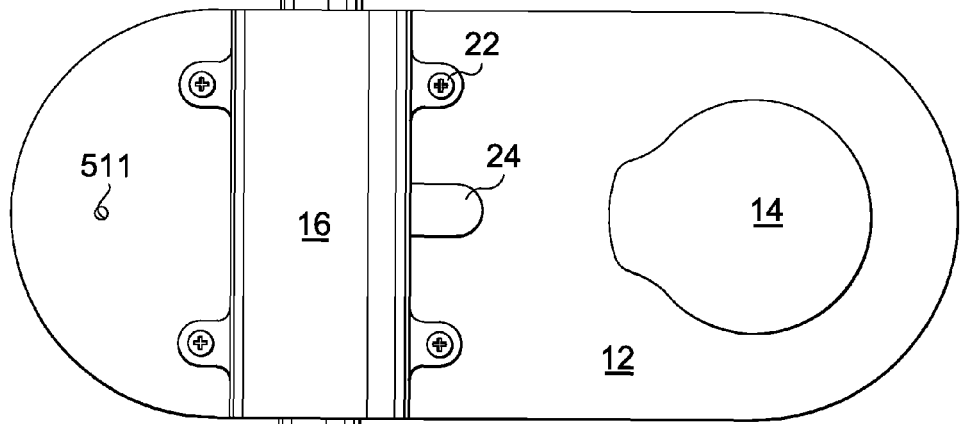
FIG. 2 is a top view illustrating the chemical treatment dispenser having a set of orifices, according an embodiment of the present invention.
Figure 3:
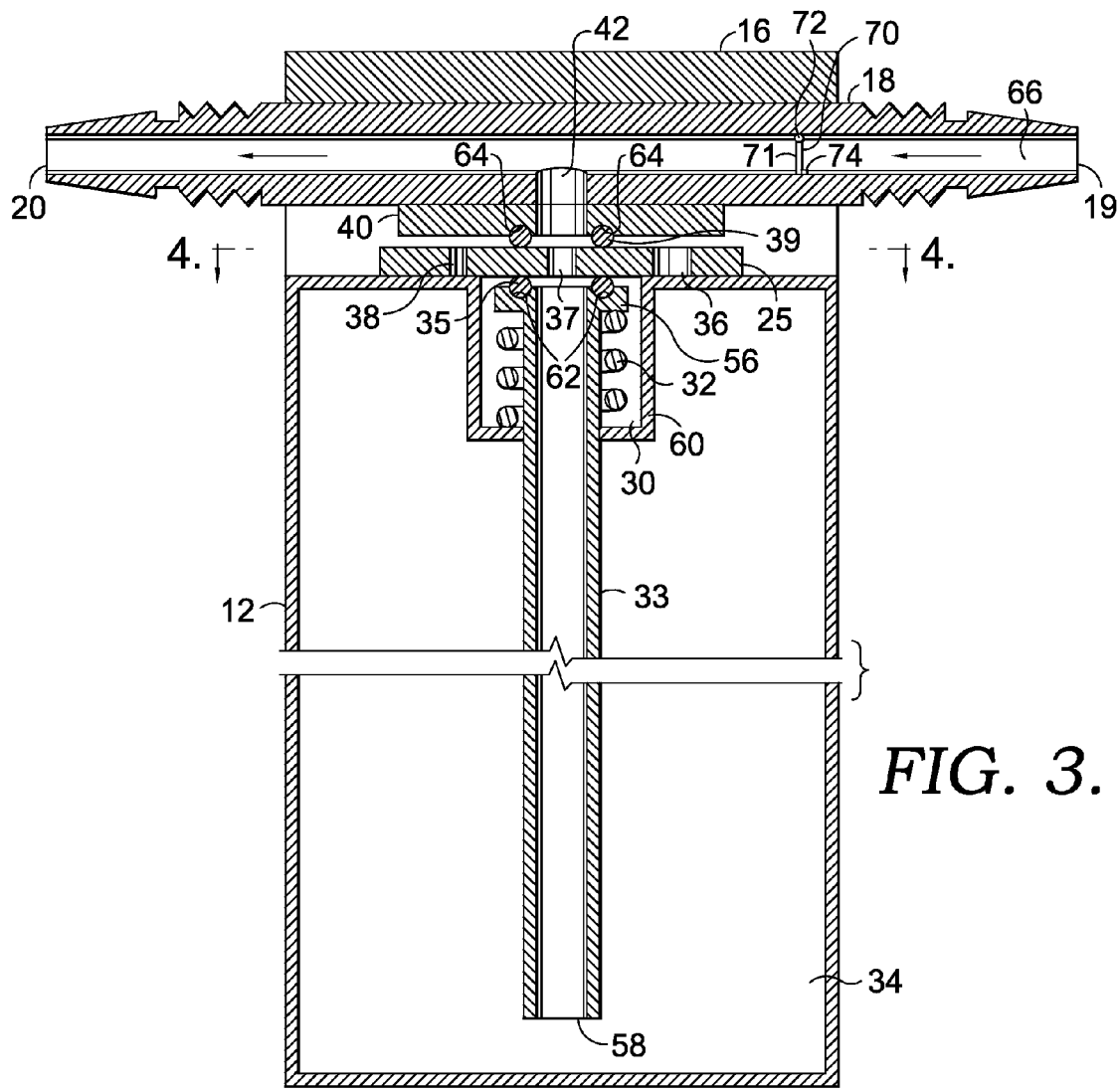
FIG. 3 is a cross section taken at 3-3 in FIG. 2.
Figure 4:
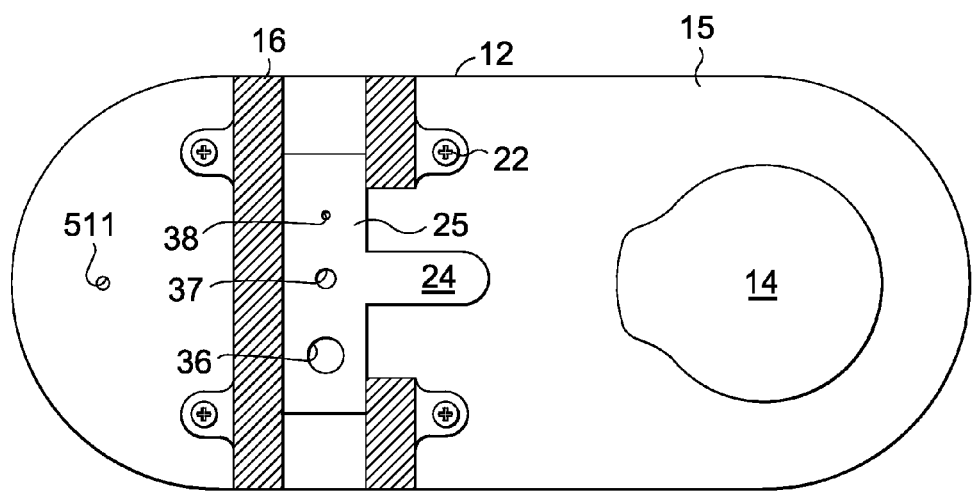
FIG. 4 is a top view looking down on the set of orifices with the features above section 4-4 removed.

Referring now to FIG. 2, a top-view of the invention is illustrated which shows fill cap 14, upper housing 16, and fasteners 22 from above. This figure also shows a tab 24 which is used to actuate a slide-metering plate 25 which may be seen in detail in FIGS. 3 and 4. The FIG. 3 a cross-sectional side-view of the present invention shows one or more exemplary parts associated with the present invention.

Device 10 also includes a siphon arrangement. The siphoning is accomplished using a vertical siphon tube 33 which may be seen in FIG. 3. The siphon tube 33 has a circular flanged top 56 and an opening 58 at the bottom. A drop down portion 60 defined into the upper surface 15 of the container has a circular cross section and defines a chamber 30 which is used to receive a compression spring 32 which is used to bear against a lower surface of flange 56. This pressure causes the upper surface of flange 56 to bear against an O-ring 39, sandwiching O-ring 39 against a lower portion of metering plate 25 to create a sealed relationship between tube 33 and an aperture (a middle aperture 37 is shown as being the selection in FIG. 3) in the metering plate. There is a first radial channel 62 defined by the upper surface of flange 56 which cups O-ring 39 so that it will not move when metering plate 25 is slid back and forth, but instead will remain secured atop the suction tube flange 56.

An upper O-ring 39 is sandwiched between the upper surface of plate 25 and the underside of a depending portion 40 which is defined by the upper housing 16. A second radial channel is defined by the underside of depending portion 40 to hold O-ring 39 in place when plate 25 moves. A vertical passageway 42 taps chemical into a longitudinal conduit 66 in which water flows through pipe 18 from end 19 to end 20. This one-way-flow limitation is created, in the disclosed embodiment, using a flapper valve 70. Flapper valve 70 has a body 72 which has disk shape which conforms to the cross section of conduit 66. When the pressure on the end 19 side of the valve is greater than the pressure on the end 20 side of the valve, it will swing open enabling flow. When the pressure on the end 20 side is greater than the pressure on the end 19 side, the lower portion of body 72 will bear against a stop member 74 and the disk body 72 will block backflow. This is important in preventing chemical flow back up into the feeder line which might cause contamination of the water distribution system.

Device 10 also includes a metering system which regulates the amount of chemical administered into conduit 66. Slide-metering plate 24 contains multiple orifices 36, 37, and 38 having various sized diameters that become selectable during the movement of slide-metering plate 25 by sliding it by manipulating cantilever tab 24 with the thumb or a finger. Each of the three orifices will result in a different flow rate. First orifice 36 is the largest and thus allows for greater flow. Second orifice 37 is smaller and will restrict flow. Third orifice 38 is the smallest and thus, will provide minimal flow. If the metering plate is slid to a position where none of orifices 36, 37, or 38 are positioned between O-rings 35 and 39, no flow will be allowed.

Assuming the device is already installed into the water line, and has been filled with cleaner as discussed above, it will be able to administer chemicals as follows. During use of the fixture, e.g., flushing the toilet, water will rush through the water supply line into which pipe 18 has been interposed causing water flowing in the line to pass through conduit 66. The flow of fluid through conduit 66 creates a vacuum in passageway 42. One having ordinary skill in the art would recognize that the dimensions of conduit 66 must be appropriately sized, while pipe 18 should have a structure and features appropriate to create the vacuum in passageway 42. This vacuum draws cleaner from chamber 34 up through tube 33 and then causes it to pass through whichever orifice of orifices 36, 37, and 38 is fluidly positioned between tube 33 and passageway 42 (unless the metering plate is positioned such that none of the orifices will allow flow and the flow of cleaner will be completely shut off). The holes are sized to allow for three separate concentrations measured in chemical per gallon. For example, first orifice 36 might allow for a concentration rate of a one-half ounce of chemical per gallon of water. Second orifice 37 might allow for a concentration rate of one-third ounce of chemical per gallon of water. Third orifice 38 might allow for a concentration rate of one-quarter ounce of chemical per every gallon of water. In an alternative embodiment of the present invention, slide-metering plate 24 may provide additional orifices for obtaining additional metered values. After this cleaner passes through the orifice (orifice 37 is selected in FIG. 3) it passes up into passageway 42, then out of pipe 18 from outlet 20 and into a water-consuming device 80.

Figure 5:
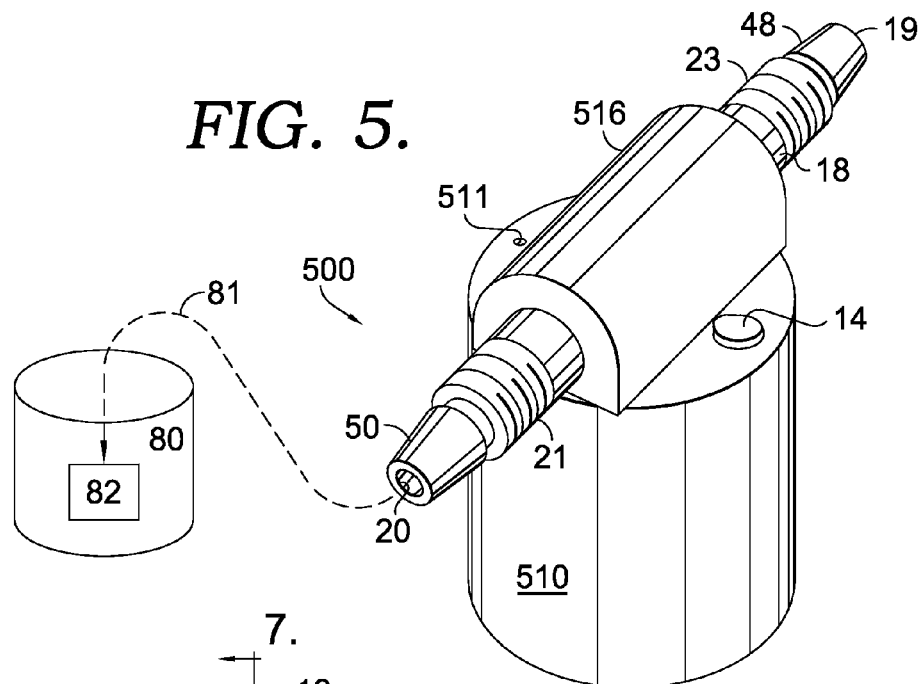
FIG. 5 is an exemplary perspective view of a chemical treatment dispenser having a set of containers with a particular container of the set installed, according an embodiment of the present invention.

Turning now to FIG. 5, an exemplary perspective view is shown illustrating an exemplary chemical treatment dispensing device 500 (hereinafter "dispenser") having a set of containers (see FIG. 8) with a particular container 510 of the set installed, according an embodiment of the present invention. In instances, the dispenser 500 is adapted be incorporated into a pressurized water supply line 81 for the water-consuming device 82. In one embodiment, the pressurized water supply line 81 is spliced in order to receive the dispenser 500, which is inserted into the pressurized water supply line 81 by attaching each end of the splice to the dispenser. By way of example, and not limitation, the water-consuming device 80 may represent a toilet, shower, or any other kind of item that consumes water and produces waste water, which may be treatable. The device has a container 510 which includes a fill cap 14. As water flows through the supply line 81, a vacuum is created in a vertical passageway which is joined into the supply line 81. This vacuum is used to siphon chemical up out of the container 510 into the supply line 81. By the time the chemical-including water reaches the toilet (or other water-consuming device) it will be evenly mixed and better able to treat the waste water than if it were directly dispensed separately.

In the exemplary embodiment the present invention is shown in FIGS. 5-8, the orifices are replaced by tubes that are respectively housed in a set of containers. Returning to FIG. 5, a perspective view of the dispenser 500 depicts various components. The dispenser 500 serves as a component of the chemical storage system described above. Generally, the treatment solution, such as a fluid chemical or liquid deodorizer, will be stored in a container 510. Container 510 is able to be filled with the fluid chemical via the fill cap 14. In one instance, container 510 is transparent or semitransparent to enable the user to perceive a level of the fluid chemical encapsulated therein. Fill cap 14 is typically located on an upper surface of the container 510, however, the fill cap 14 may be positioned on any exposed area on the container 510. When a user wishes to fill container 510 with fluid chemical (e.g., upon detecting the level of the fluid chemical is low within the transparent container 510), cap 14 is removed to reveal an opening (not shown) into the container. Fill cap 14 may be a snap-on type cap, but may also be a screw-on or any other type of cap if desired.

Figure 7:
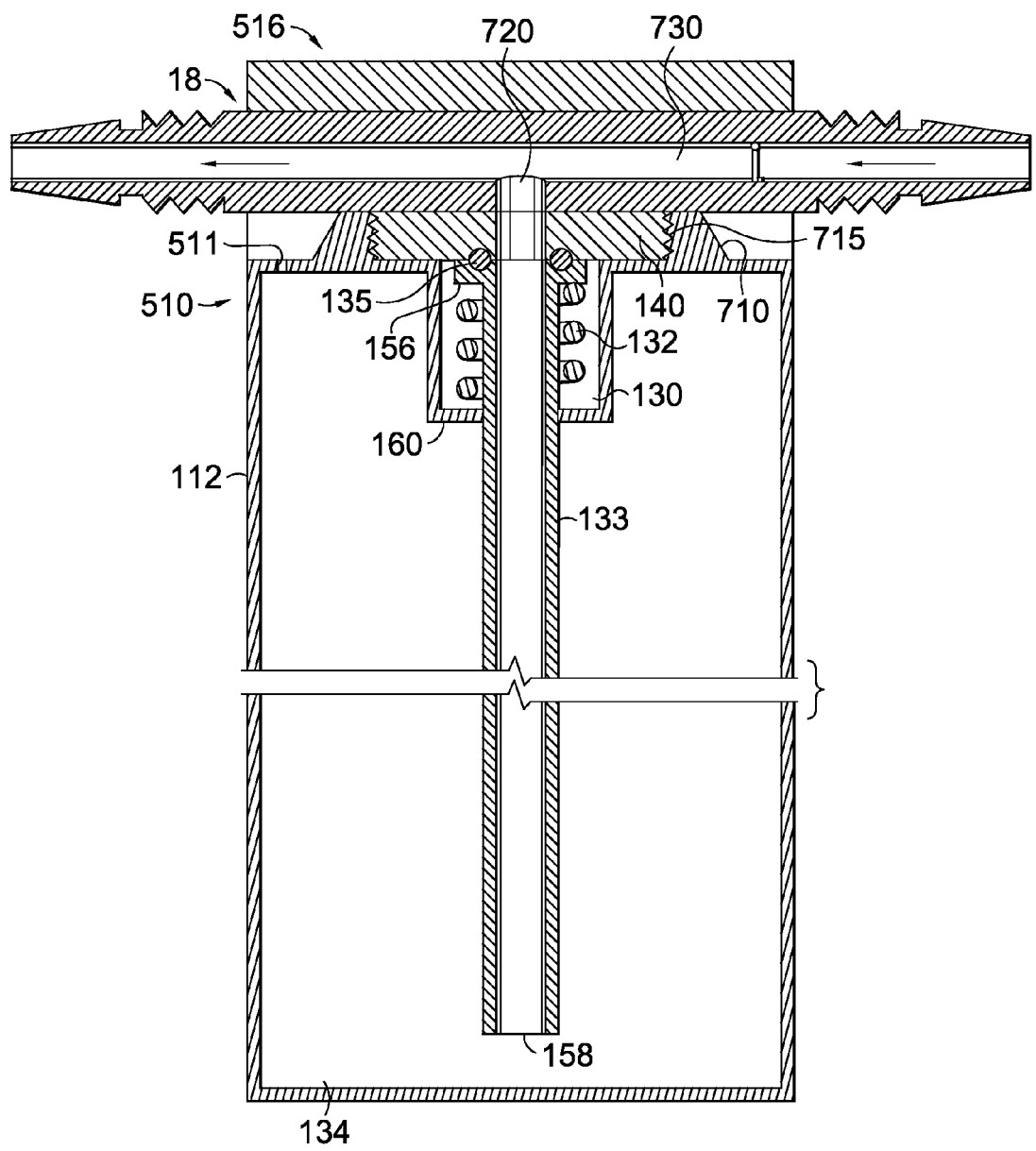
FIG. 7 is a cross section taken at 7-7 in FIG. 6.

Container 510 is adapted to fluidly communicate with a water pipe 18. Physically, water pipe 18 is brought into junction with container 510 using an upper housing 516. In an exemplary embodiment, housing 516 is releasably attached to the container using threaded engagement 715. By way of example, as depicted at FIG. 7, the container 510 includes a raised bushing 710 that is internally threaded, while the housing 516 includes a substantially cylindrical element 140 that is externally threaded. Accordingly, the container may be installed by inserting the element 140 within the bushing 710 and twisting to form the threaded engagement 715, thus coupling the housing 516 to the container 510.

Although a single fastening mechanism has been described, it should be understood and appreciated that other fastening mechanisms or arrangements could be used as well, and that the scope of the present invention is not limited to the threaded engagement 715. For example, fasteners (e.g., screws, bolts, rivets, and the like) could be used for securing the housing 516 to the container 510. Alternatively, a snap-to-fit arrangement may be employed, where prongs depending from a bottom of the housing 516 are received in receiving apertures in an upper surface of the container 510.

Generally, the pipe 18 may receive water, or any other liquid to which the fluid chemical is to be added, in the fluid inlet 19 and dispense treated water 82 from the fluid outlet 20. A set of threads 23 are associated with inlet 19 and a second set of threads 21 are associated with outlet 20. Each end also has tapered portions 48 and 50, respectively, which enable tubing (not shown) to be easily slide onto and couple to the respective pipe ends of the fluid inlet 19 and the fluid outlet 20. Thus, the dispenser 500 can be spliced into the pressurized water line 81 which feeds into the water-consuming device 80, such as the toilet by simply cutting the line and inserting the dispenser 500.

Once the ends of the inlet 19 and the outlet 20 are spliced into each of the cut ends of the water line 81 (e.g., hose, tubing, and the like), the water line 81 may be further secured using screw-on pipe nut (not shown), which may have reciprocating threads that engage the threads 21 and 23 to create a water-tight seal and to lock the water line 81 onto the pipe 18. In other embodiments, a quick-connect-coupler arrangement or other fastening mechanisms for creating a water-tight seal may be employed to accomplish this same task. It should be understood that embodiments of the present invention should not be limited to any manner in which pipe 18 is fluidly connected into the water line 81.

Figure 6:
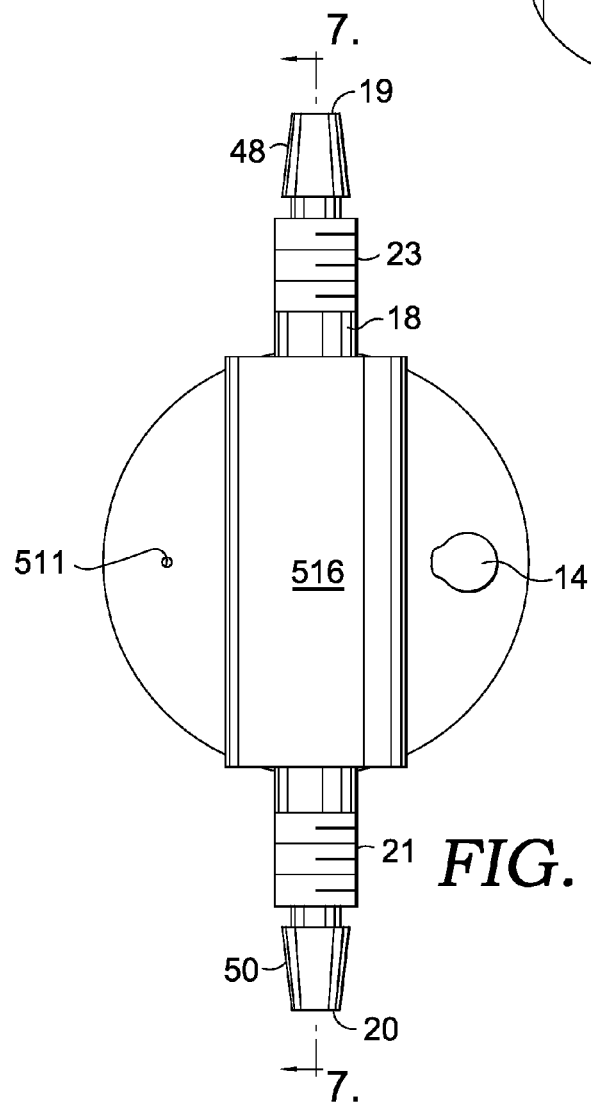
FIG. 6 is a top view illustrating the chemical treatment dispenser having a set of containers, according an embodiment of the present invention.

Referring now to FIGS. 6 and 7, FIG. 6 shows a top-view of an embodiment of the dispenser 50, which depicts an illustrative fill cap 14, upper housing 516, and a vent 511 from above. FIG. 7 depicts a cross-sectional side-view of an embodiment of the dispenser 500 of the present invention, and shows exemplary parts associated therewith.

In an exemplary embodiment, the dispenser 510 includes a siphon arrangement that generates a vacuum within the container 510 to draw the fluid chemical therefrom via a vertical siphon tube 133. In one instance, the vacuum is generated by flowing water over the siphon tube 133. The siphon tube 133 may have a circular flanged top 156 and an opening 158 at the bottom. A drop down portion 160 defined into the upper surface of the container 510 has a circular cross section and defines a chamber 130, which is used to receive a compression spring 132. The compression spring 132, or any other compression resistive mechanism, may be employed to load a vertical extensive force that bears against a lower surface of the flange 156 and the bottom of the chamber 130.

This force causes the upper surface of flange 156 to bear against an O-ring 135, thereby retaining and compressing the O-ring 135 against a lower portion of the element 140 formed into the housing 516. When compressed, the O-ring 135 provides a sealed relationship between the tube 133 and a vertical passage 720 within the housing 516 that is in fluid communication with a horizontal passage 730 within the pipe 180, which provides a flow path of the water. In operation, the vertical passageway 720 taps fluid chemical into the longitudinal passageway 730, which provides a flow path through pipe 18 from end 19 to end 20. Further, the intersection of the passage 720 and the passage 730 may be designed to promote combination of the water in the flow path and the fluid chemical from the container 510, thereby resulting in a substantially homogenous mixture, referred to herein as the treated water 82 (see FIG. 5). Although described herein as passages forming substantially a T-style intersection for combining the fluid chemical with the water, other conduit configurations are considered by embodiments of the present invention; thus, the dispenser 500 is not limited in scope to the arrangement of the vertical passage 720 and the horizontal passage 730. For instance, a plurality of smaller passages may be bored into the element 140 that extend diagonally (upwardly and radially outward) from the tube 133; accordingly, fluidly connecting the container 510 with the passage 730 and providing additional functionality. This additional functionality may include filtering solid masses from the fluid chemical before it reaches the flow path and/or more evenly distributing the fluid chemical within the water by providing a plurality of entrances into the passage 730.

There may be machined a first radial channel within the upper surface of the flange 156 that partially cups O-ring 135 so that it will not move laterally when the container 510 is installed to the housing 516, but may, instead, will remain secured atop the flange 156 of the tube 133. In another embodiment, where the O-ring 135 is sandwiched between the upper surface of the flange 156 and the underside of the element 140 of the housing 516, a second radial channel is may be machined into the underside of the element 140 to hold the O-ring 135 in place during attachment and disengagement of the container 510 from the housing 516. Thus, the seal created by the O-ring 135 ensures that a suction can be produced in the passage 720 and in the tube 133.

In operation, as more fully described below, the suction pulls fluid chemical stored within the container 510 into the flow path of passage 730. This fluid chemical is displaced by air that enters the container via the vent 511 bored within an exposed surface of the container 510. Typically, a bore of the vent is sized to allow air to enter the container 510, while preventing the chemical fluid from exiting. In instances, as discussed above, the flow path is provided with a one-way-flow feature. In embodiments, this feature may be implemented using a flapper valve, which has disk shape that conforms to a cross section of the passage 730. In other embodiments, the one-way-flow limitation is provided by a spring-loaded ball valve, wherein the ball is selected to conform to an internal diameter of the passage 730. When the pressure on the end 19 (entrance) of the valve(s) is greater than the pressure on the end 20 (exit) of the valve(s), the flapper valve and/or the ball valve will open and provide a continuous flow path for the water to traverse the dispenser 510. When the pressure on the end 20 (exit) is greater than the pressure on the end 19 (entrance), the valves will block backflow within the passage 730. Preventing fluid chemical backflow into a feeder line avoids causing contamination of the water distribution system.

Figure 8:
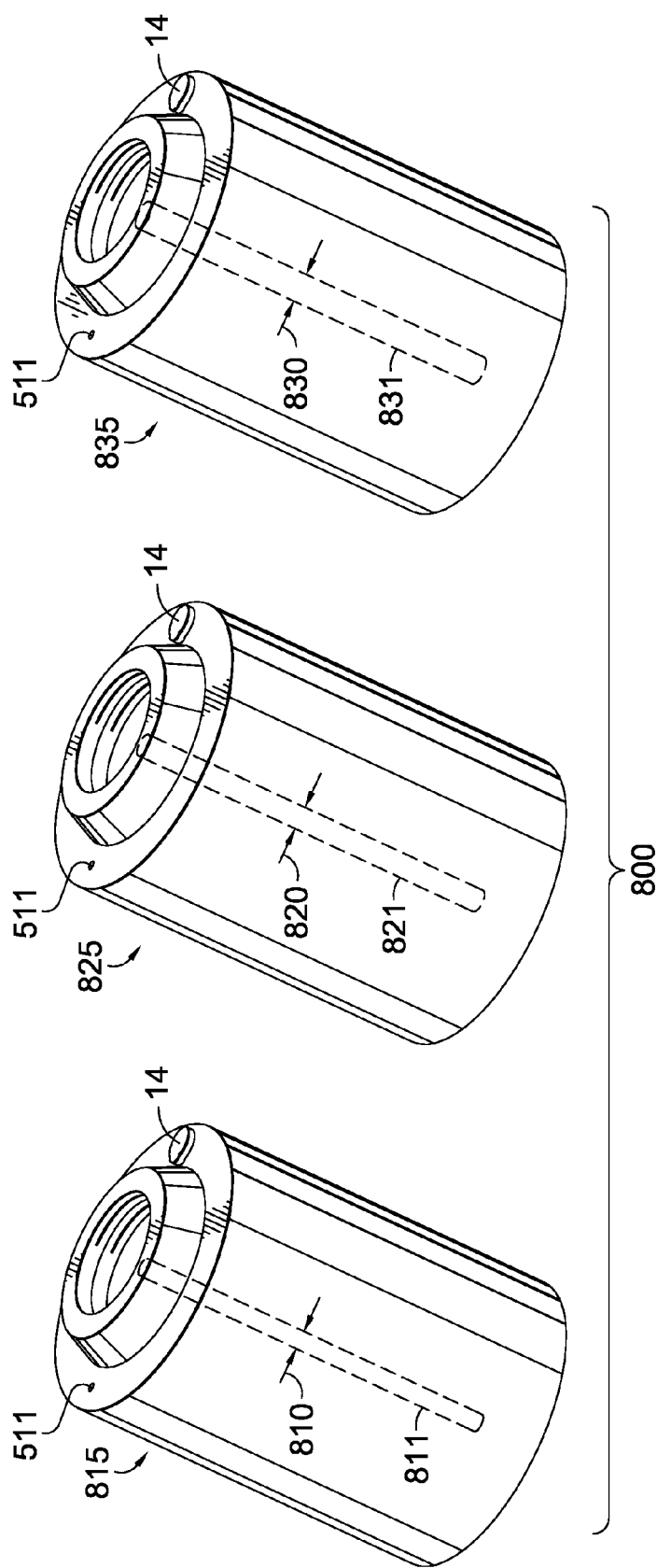
FIG. 8 is perspective view of the set of containers that may be each individually installed to a chemical administering system.

Dispenser 500 also includes a metering system that regulates the amount of fluid chemical administered into the flow path of the water. With reference to FIG. 8, a set of containers 800 is provided, where each of the containers 815, 825, and 835 includes an individual tube 811, 821, and 831, respectively. These tubes 811, 821, and 831, in embodiments, are configured with varied sized diameters. The variations in the diameters allow an operator/user/serviceperson to dictate the rate of flow of the fluid chemical from one of the containers 815, 825, and 835 into the flow path by selecting an appropriate one of the set of containers 800. Because, each of the containers 800 is releasably attached to the housing 516, the tubes 811, 821, and 831 are selectable upon disengaging one of the containers 800 and installing another of the containers 800.

Generally, each of the diameters 810, 820, and 830 associated with the tubes 811, 821, and 831, respectively, and each of the diameters 810, 820, and 830 result in a different flow rate under a consistent siphon. For instance, as illustrated in FIG. 8, the container 815 accommodates the tube 811 configured with the diameter 810, which is shown as the smallest diameter, thus, allowing for highly restricted flow when a minimal amount of fluid chemical is required. The container 825 accommodates the tube 821 configured with the diameter 820, which is shown as the mid-range diameter. Further, the container 835 accommodates the tube 831 configured with the diameter 830, which is shown as the largest diameter, thus, allowing for ample flow when a large, or maximum, amount of fluid chemical is required.

Assuming the dispenser 500 is presently installed into a splice within the water line 81, and one of the containers 800 has been filled with a sufficient amount of fluid chemical to create a fill level that is above the bottom entrance 58 of the tube 133 (see FIG. 7), upon invocation of a flow of water through the passage 730, a siphon will be created. Generally, this siphon typically induces a particular amount of vacuum within the passage 720 that pulls a certain amount of fluid chemical from the tube 133, which is subsequently administered to the water in the flow path at a predefined flow rate. The sizing of the tube's diameter controllably meters the flow of the fluid chemical and allows a user to select and set a specific concentration of the fluid chemical within the treated water 82 (see FIG. 5).

Initially, during operation of the water-consuming device 80 (see FIG. 5), such as flushing the toilet, water may traverse through the water supply line 81 into and into the pipe 18 of the housing 516, which has been interposed within the supply line 81 causing water flowing therein to pass through the passage 730 (see FIG. 7). The flow of water through the creates a vacuum in passageway 720. It will be understood and appreciated that the dimensions of passageway 370 are appropriately sized, and the pipe 18 is configured a structure and features, appropriate to create the vacuum in passageway 730. This vacuum draws a specific flow rate of fluid chemical from a chamber 134 within the container 510 up through tube 133 and then into the passageways 730 and 720; thus, mixing with the water as it passes through the housing 516.

In an exemplary embodiment, one of the containers 800 of FIG. 8 is employed. The diameters 810, 820, and 830 are sized to allow for a variety of separate flow rates and, thus, separate concentrations of fluid chemical within the water. In instances, the concentration is measured in terms of "chemical per gallon." However, for there to be consistency in the predefined concentrations (discussed infra), the siphon arrangement depends on a regular flow rate of the water through the passageway 730 to create a unvarying vacuum in the passageway 720 and unvarying suction in the tube 133. This unvarying suction causes the fluid chemical to be automatically drawn out of the container 510 in the same predefined concentration flush after flush. The concentration is typically predefined by selecting a tube configured with a particularly sized diameter.

For example, when the container 815 is installed to the housing 516, the smaller diameter 810 of the tube 811 highly restricts the flow rate of the fluid chemical leaving the container 815 (when a particular level of vacuum is consistently applied in the passageway 730) allowing for a concentration rate of a one-quarter ounce of chemical per gallon of water. When the container 825 is installed to the housing 516, the mid-range diameter 820 of the tube 821 provides less restriction on the flow rate of the fluid chemical leaving the container 825 (when a particular level of vacuum is consistently applied in the passageway 730) allowing for a concentration rate of one-third ounce of chemical per gallon of water. When the container 835 is installed to the housing 516, the larger diameter 830 of the tube 831 provides less restriction on the flow rate of the fluid chemical leaving the container 835 (when a particular level of vacuum is consistently applied in the passageway 730) allowing for a concentration rate of one-half ounce of chemical per every gallon of water.

Although three different tubes with different diameters to create different chemical-per-gallon concentrations are discussed, it should be understood and appreciated that any number of containers with differing tubes may be provided within the set of containers 800. Further, although specific diameters 810, 820, and 830 are described and shown, which cause different flow rates to achieve different chemical-per-gallon concentrations, other diameters that provide other chemical-per-gallon concentrations may be employed, where the other diameters provide additional metered values of concentration. Further, although the tubes 811, 821, and 831 are shown with consistent diameters 810, 820, and 830, respectively, the tubes 811, 821, and 831 may have various diameters throughout to create turbulent flow that enhances mixing the fluid chemical with the water, where the minimum value of the diameter per tube sets the flow rate of the tube (acting similar to an orifice).

After the fluid chemical passes through one of the respective tubes, depending on which of the containers 800 is selected and installed to the housing 516, the fluid chemical passes up into passageways 720 and 730. At this point, the fluid chemical is mixed with the water to create the treated water 82. The treated water 82 flows within the flow path of the housing 516 and then out of the pipe 18 via outlet 20 into the water-consuming device 80.

Advantageously, the introduction of the fluid chemical into the water to create treated water 82 in advance of the water being transmitted into the toilet may cause the treated water 82 to be thoroughly mixed. Thus, pocketing problems, where the fluid chemical and the water were not properly combined, are ameliorated.

This disclosure sets forth illustrative examples of various embodiments for a method and device that provides a chemical solution or fluid to be vacuum drawn into a fluid pipe to provide a mix solution at the fluid outlet. The present invention is not limited to any particular type of connector, o-ring, or composition of material (plastic, metal, etc.) for the device.

Certain features and subcombinations are of utility and may be employed without reference to other features and subcombinations and are contemplated within the scope of the claims. Not all steps listed in the various figures need to be carried out in the specific order described.

It should be understood that the construction of the dispenser 500 lends itself to enable the various containers with one or more tubes housed by each to be easily assembled and disassembled from the chemical administering system. Specifically the nature of the tube(s), allows for controllably metering a rate of fluid-chemical flow, while enabling rapid switching between rates of flow, such as by replacing containers installed on the chemical administering system. Accordingly, any rapid connection/disconnection elements or components, as well as any number of containers in the set provided with the chemical administering system, are implementations considered within, and consistent to, embodiments of the present invention.

The present invention has been described in relation to particular embodiments, which are intended in all respects to be illustrative rather than restrictive. Alternative embodiments will become apparent to those skilled in the art to which the present invention pertains without departing from its scope.

It will be seen from the foregoing that this invention is one well adapted to attain the ends and objects set forth above, and to attain other advantages, which are obvious and inherent in the device. It will be understood that certain features and subcombinations are of utility and may be employed without reference to other features and subcombinations. This is contemplated by and within the scope of the claims. It will be appreciated by persons skilled in the art that the present invention is not limited to what has been particularly shown and described hereinabove. Rather, all matter herein set forth or shown in the accompanying drawings is to be interpreted as illustrative and not limiting.

The invention claimed is:

1. A chemical dispensing apparatus for delivery of a fluid chemical into a water supply line for a water-consuming wastewater treatment device, the apparatus comprising:
    a set of three interchangeable containers for holding the fluid chemical; and
    a chemical administering system adapted to vacuum the fluid chemical from one of the three containers into the water supply line for the water-consuming wastewater treatment device, wherein the water-consuming wastewater treatment device stores a mixture of the fluid chemical and water delivered by the water supply line;
    wherein each of the three interchangeable containers includes a differently sized tube, each tube being adapted to provide a flow path delivering the fluid chemical into the water supply line and to restrict a flow of the chemical, and
    the three tubes being configured with diameters sized to allow for a concentration of one-half ounce of chemical per gallon water, one-third ounce of chemical per gallon water, and one-quarter ounce of chemical per gallon water, respectively, thereby controlling the amount of chemical administered into the water supply line.

2. The apparatus of claim 1, wherein a subject tube of the three tubes is placed into the flow path upon one of the three containers being installed to the chemical administering system, wherein the installed container accommodates the subject tube, and wherein a diameter of the subject tube is located between the water supply line and the installed container such that the subject tube controllably regulates the flow of the fluid chemical.

3. The apparatus of claim 1, wherein the water-consuming device is a toilet.

4. The apparatus of claim 1, wherein the administering system comprises:
- a pipe which is adapted to be spliced into the water supply line; and
- a vertical conduit with an upper end and a lower end, the upper end being tapped into the supply line, the lower end having an inlet which receives the fluid chemical up into the vertical conduit for the purpose of administering it into the supply line.

5. The apparatus of claim 4, wherein the pipe is secured to an installed container, of the three containers, by a housing adapted to fasten to an upper surface of the installed container.

6. The apparatus of claim 5, wherein the pipe is secured to the installed container by engaging threads on the upper surface of the installed container to threads machined into the housing.

7. The apparatus of claim 6, further comprising:
- a fill opening on the upper surface of the container; and
- a removable fill cap adapted to optionally expose or seal off the opening so that the container is able to be filled with fluid chemical.

8. The apparatus of claim 1, further comprising a valve in fluid communication with the water supply line that is located upstream of a junction at which the fluid chemical is introduced to the water supply line, wherein the valve is configured for disallowing back flow of cleaner upstream into the water supply line.

9. A method of dispensing a fluid chemical into a water-consuming device for the purpose of treating waste-water, the method comprising:
- storing the fluid chemical in one of a set of three containers, wherein each of the three containers accommodates one of three differently sized tubes having diameters sized to allow for metering of a concentration of one-half ounce of the fluid chemical per gallon water, one-third ounce of the fluid chemical per gallon water, and one-quarter ounce of the fluid chemical per gallon water, respectively;
- controlling a chemical consumption rate by the following procedure:
  - (a) installing one of the three containers to a chemical administering system adapted to vacuum the fluid chemical from the installed container into the water supply line for the water-consuming device, wherein the installed tube accommodates a subject tube of the three tubes; and
  - (b) interposing the subject tube into a chemical flow path which leads into the water supply line; and
- delivering the fluid chemical into the water supply line, which feeds into the water-consuming device, by drawing the fluid chemical out of the installed container via the subject tube using a vacuum created by a pressurized flow of water in the water supply line.

10. A chemical dispensing apparatus for delivery of a fluid chemical into a water supply line for a water-consuming wastewater treatment device, the apparatus comprising:
- a set of three interchangeable containers for holding the fluid chemical;
- a chemical administering system adapted to generate a vacuum that pulls the fluid chemical from one container of the set of the three containers that is releasably attached to the chemical administering system, wherein the vacuum pulls the fluid chemical into the water supply line for the water-consuming wastewater treatment device, wherein the water-consuming wastewater treatment device stores a mixture of the fluid chemical and water delivered by the water supply line; and
- a metering system for controlling the amount of fluid chemical administered into the water supply line,
- wherein the metering system comprises three differently sized tubes, each of these being housed by a respective container, of the three containers,
- wherein the tubes individually provide a flow path of the fluid chemical into the water supply line and controllably restrict a flow of the fluid chemical when the vacuum is applied, and
- wherein the tubes are each sized to allow for a concentration of one-half ounce of the fluid chemical per gallon water, one-third ounce of the fluid chemical per gallon water, and one-quarter ounce of the fluid chemical per gallon water, respectively.

* * * * *